(12) United States Patent
Dayal

(10) Patent No.: US 6,658,545 B1
(45) Date of Patent: Dec. 2, 2003

(54) PASSING INTERNAL BUS DATA EXTERNAL TO A COMPLETED SYSTEM

(75) Inventor: Surender Dayal, Allentown, PA (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/504,749

(22) Filed: Feb. 16, 2000

(51) Int. Cl.$^7$ .............................................. G06F 12/00
(52) U.S. Cl. .................... 711/169; 711/146; 711/154
(58) Field of Search ............................ 711/146, 169, 711/154

(56) References Cited

U.S. PATENT DOCUMENTS

| | | | | |
|---|---|---|---|---|
| 5,325,503 A | * | 6/1994 | Stevens et al. | 711/146 |
| 5,325,511 A | * | 6/1994 | Collins et al. | 711/128 |
| 5,335,335 A | * | 8/1994 | Jackson et al. | 711/121 |
| 5,341,487 A | * | 8/1994 | Derwin et al. | 711/146 |
| 5,426,765 A | * | 6/1995 | Stevens et al. | 711/131 |
| 5,446,863 A | * | 8/1995 | Stevens et al. | 711/100 |
| 5,517,626 A | * | 5/1996 | Archer et al. | 710/105 |
| 5,678,003 A | * | 10/1997 | Brooks | 714/34 |
| 5,682,492 A | * | 10/1997 | McFarland et al. | 712/214 |
| 5,787,095 A | * | 7/1998 | Myers et al. | 714/820 |
| 5,884,027 A | * | 3/1999 | Garbus et al. | 370/402 |
| 5,903,911 A | * | 5/1999 | Gaskins | 711/141 |
| 5,913,045 A | * | 6/1999 | Gillespie et al. | 710/266 |
| 5,923,893 A | * | 7/1999 | Moyer et al. | 712/200 |
| 5,983,338 A | * | 11/1999 | Moyer et al. | 712/220 |
| 6,145,099 A | * | 11/2000 | Shindou | 714/37 |

* cited by examiner

Primary Examiner—Reba I. Elmore

(57) ABSTRACT

An apparatus and technique to allow internal bus activity of a system on a chip to be monitored external to the integrated circuit, but without requiring additional external pins. A snooping pass through device on the internal bus, e.g., a snooping external memory interface (EMI) includes operability to directly pass through activity on the internal bus to the external memory bus. One or more snoop cycles are inserted into a memory access of an internal bus of a system on a chip. The snooping pass through device preferably includes an external bus already having pins routed external to the integrated circuit. The external bus leading from the snooping pass through device (e.g., from the EMI) may be multiplexed for use both for its otherwise conventional function while not in a snoop cycle, and for use in directly observing activity on the internal bus when during a snoop cycle. Additional signals may be multiplexed into the EMI for pass through during snoop cycles. One or more snoop cycles may be inserted under software and/or hardware control. Moreover, snooping functionality may be used to replace idle cycles in a memory access operation. Virtually any internal signal within a system on a chip may be passed through a snooping pass through device during a snoop cycle, allowing step-by-step cycle sensitive debugging by system designers.

23 Claims, 9 Drawing Sheets

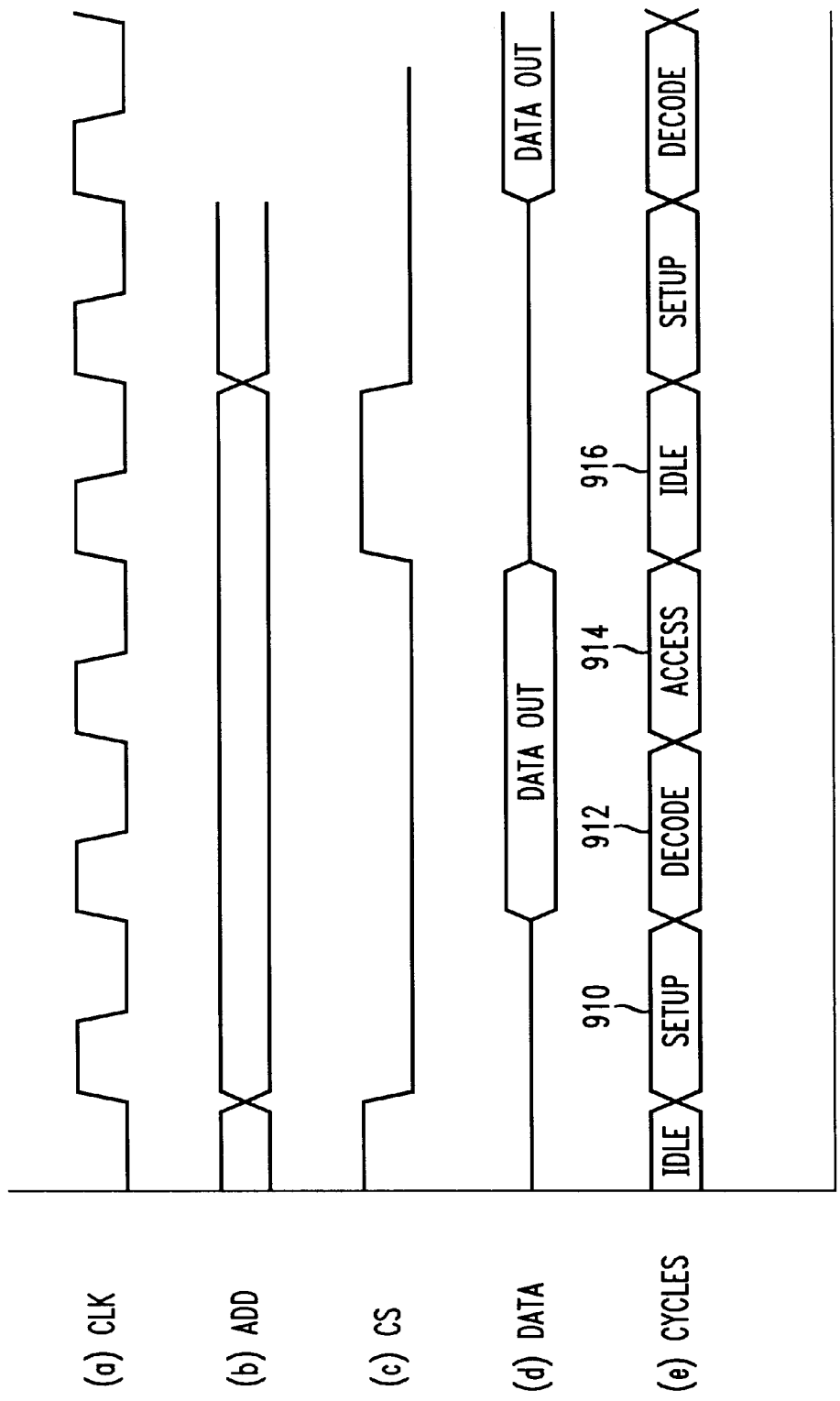

PASSING INTERNAL BUS DATA EXTERNAL TO A COMPLETED SYSTEM

BACKGROUND OF THE INVENTION

1. Field of the Invention

This invention relates generally to system on a chip integrated circuits. More particularly, it relates to an apparatus and technique for monitoring internal bus functions of an integrated circuit without requiring additional external pins on the integrated circuit.

2. Background of Related Art

One of the biggest problems faced by system on a chip designers is the ability to monitor what is going on inside the system.

One conventional solution is to provide additional external pins on the device corresponding to selected internal nodes of the system. However, system on a chip integrated circuits are typically already PAD limited, and typically already have a very high external pin count. Moreover, even if one has the opportunity to provide additional external pins, doing so adds cost to the manufacturing of the integrated circuit.

FIG. 8 shows a block diagram of a conventional system on a chip integrated circuit.

In particular, in FIG. 8, an integrated circuit 850 is formed including a plurality of devices communicating via an internal bus 810. For instance, as shown in FIG. 8, an appropriate processor (e.g., microprocessor, microcontroller, or digital signal processor (DSP)) controls a system including, e.g., SRAM and/or ROM 802 connected to a memory socket (MEM).

Such a system on a chip typically further includes an internal bus 810 connected to the processor, e.g., through an internal El socket. The internal bus 810 may have any application specific components in communication therewith, e.g., a direct memory access controller (DMAC) 806, an Ethernet MAC 808, a Universal Serial Bus (USB) 818, a peripheral Components Interface (PCI) interface 812, a high speed input/output (HSIO) device 814, and/or an external memory interface 816.

As shown in FIG. 8, some of the components may have pins or busses passing through external to the integrated circuit, e.g., the Ethernet MAC 808, the USB 818, the PCI 812, the HSIO 814, and/or the EMI 816. For instance, the EMI interface 816 is shown in FIG. 8 connected to an external bus accessing external SDRAM 830 and external ROM 832.

FIG. 9 shows waveforms showing exemplary cycles of activity on an internal bus 810 of a conventional system on a chip.

For instance, a system clock signal is shown in waveform (a) of FIG. 9. Activity on an address bus is shown in waveform (b). A chip select signal (CS) to a particular bus device (e.g., the EMI 816) is shown in waveform (c). Associated data (e.g., data OUT) is shown in waveform (d) in relation to the address bus and chip select signal.

Waveform (e) of FIG. 9 depicts the various cycles of the internal bus 810. During a setup cycle 910, the chip select signal (waveform (c)) to the appropriate device is presented to the internal bus 810, and the address on the internal bus 810 is allowed to settle. The length of the setup cycle 910 is.often dictated by the speed of the device being accessed, e.g., memory.

After setup, the now valid address on the address bus (waveform (b)) is decoded by the various circuitry to determine the particular device being addressed. The addressed device responds with the appropriate data as shown in waveform (d).

After the data settles on the internal bus 810 by the end of the decode cycle 912, access to the addressed data is performed during an access cycle 914.

The internal bus 810 typically remains idle during the time after access is performed in the access cycle 914 and before the next setup cycle begins. This is referred to herein as an idle cycle 916.

Systems on a chip are compact devices offering miniaturization to designers. However, systems on a chip are extremely difficult to debug during development, in part because of the limitations on the signals available external to the integrated circuit.

For instance, the actual activity on the internal bus 810 of the system is not directly observable by a designer, but rather must be inferred by observations made in memory, registers, etc. However, these inferences do not always allow distinctions to be made between subtle actions which occur during the various cycles of the internal bus 810. Because of this, conventional debugging systems are limited to connections to exploration of external RAM memory, e.g., the external SDRAM 830, to view changes as a system is operated within the integrated circuit. This requires inferences to be made on the part of the system debugger, ultimately slowing down the debugging process.

There is a need for an improved technique and method for monitoring internal functions of a system on a chip, e.g., for the purposes of debugging a system design.

SUMMARY OF THE INVENTION

In accordance with the principles of the present invention, a state generator comprises a plurality of memory access cycles within a single memory access. A system debugging snoop cycle is adapted for insertion between two of the plurality of memory access cycles to allow pass through of activity on an internal bus controlled by the state generator through a device communicating over the bus.

A method of passing internal bus data through a component of a system on a chip integrated circuit in accordance with another aspect of the present invention comprises inserting a snoop cycle in a memory access, and directly passing activity on an internal bus internal to the system on a chip integrated circuit to an external bus of a snooping pass through device during the snoop cycle.

BRIEF DESCRIPTION OF THE DRAWINGS

Features and advantages of the present invention will become apparent to those skilled in the art from the following description with reference to the drawings, in which:

FIG. 4 shows the insertion of the snoop cycle between the setup cycle and the decode cycle, while FIG. 5 shows the insertion of the snoop cycle between the decode cycle and the access cycle.

FIG. 9 shows waveforms showing exemplary cycles of activity on an internal bus of a conventional system on a chip.

DETAILED DESCRIPTION OF ILLUSTRATIVE EMBODIMENTS

The present invention provides an apparatus and technique to allows internal bus activity of a system on a chip to be monitored external to the integrated circuit, without requiring additional external pins.

Conventionally, activity on an internal bus of a system on a chip integrated circuit is analyzed by observation of the state of the various devices communicating over the internal bus (as permitted by external connections to the various devices). For instance, a common technique is to observe the state of various registers and memory locations in external RAM after a programmable breakpoint event has occurred in the system on a chip. However, as discussed, conventional techniques do not allow a system designer the capability to directly observe the functions of the internal bus, including resolution between functions which occur during the various cycles of the internal bus.

The present invention adds one or more snoop phase(s) or cycles to the memory access cycle of an internal bus of a system on a chip. The snoop cycle allows internal activity on an internal bus to be passed through to the system on a chip integrated circuit for external observation by a system designer, without danger of affecting system functionality.

The snooping pass through device (e.g., an external memory interface (EMI) in the disclosed embodiments) preferably includes an external bus already having pins routed external to the integrated circuit. The external bus leading from the snooping pass through device (e.g., from the EMI) may be multiplexed for use both for its otherwise conventional function while not in a snoop cycle, and for use in directly observing activity on the internal bus when during a snoop cycle.

Figure 1:
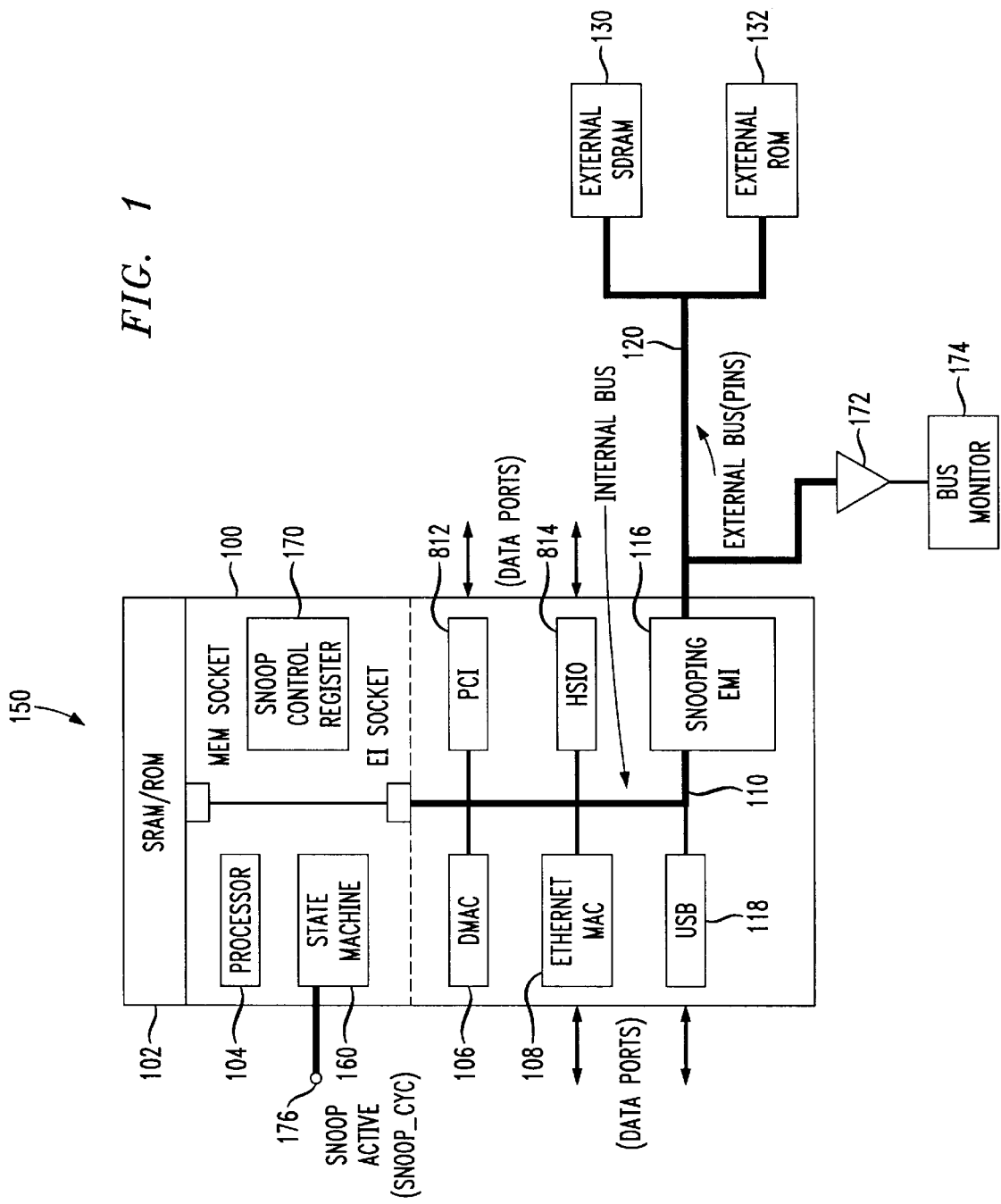
FIG. 1 shows an exemplary system on a chip integrated circuit including a snooping pass through device such as a snooping EMI allowing real time bus activity pass through between an internal bus and an external memory bus, in accordance with the principles of the present invention.

For instance, FIG. 1 shows an exemplary system on a chip integrated circuit 150 including a snooping pass through device, in accordance with the principles of the present invention.

Figure 8:
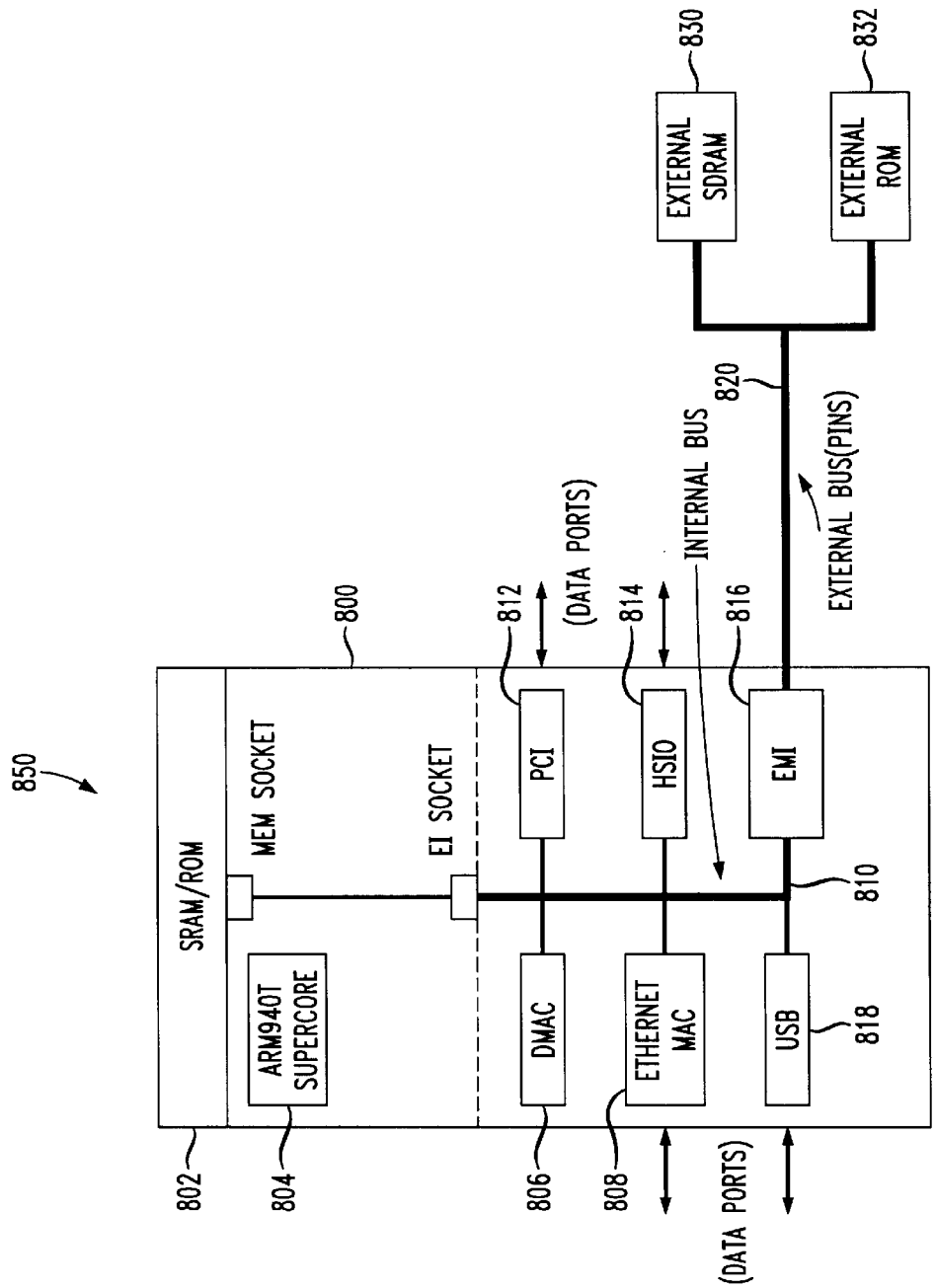
FIG. 8 shows a block diagram of a conventional system on a chip integrated circuit.

In particular, in FIG. 1, a system on a chip integrated circuit 150 includes a processor 104, a state machine 160 for generating access cycles on an internal bus 110, a snooping pass through device (e.g., a snooping EMI 116), and a snoop control register 170. Other devices shown in FIG. 1, e.g., a dynamic memory access controller (DMAC) 106, an Ethernet MAC 108, a Universal Serial Bus (USB) 118, a Peripheral components interface (PCI) 812, and a high speed input/output (HSIO) device 814, are substantially as shown and described with respect to FIG. 8, and are shown for exemplary purposes only. It is to be understood that the particular devices implemented in a system on a chip in accordance with the principles of the present invention may be different from those shown in FIG. 1.

The processor 104 may be any suitable processor, e.g., a microcontroller, a microprocessor (e.g., RISK, Pentium®-type, etc.), or a digital signal processor (DSP).

The state machine 160 may be any appropriate logic and/or software element which produces the cycles of access using the internal bus 110. For instance, the state machine 160 shown in FIG. 1 generates a setup cycle, decode cycle, and access cycle (as well as any idle time) for accesses between the processor 104 and any device communicating over the internal bus 110. Moreover, in accordance with the principles of the present invention, the state machine 160 (or other suitable element in the system on a chip integrated circuit) generates a snoop cycle between any two otherwise conventional memory access cycles.

Preferably, the state machine 160 can institute or remove the snoop cycle 176 under software and/or hardware control.

In operation, the snooping EMI 116 monitors activity on the internal bus 110, decodes addresses on the internal bus 110, and when appropriate generates a correct external address on the external bus 120 to the external memory 130, 132. When a valid address for the EMI 116 is detected by the EMI 116, the EMI 116 drives the appropriate signals on an external bus 120. to access external memory (e.g., external SDRAM 130 and/or external ROM 132). The external bus 120 uses conventionally provided external bus pins.

During the SNOOP cycle, the state machine of the external memory interface (EMI) drives all internal bus activity onto the external bus 120. That is, all of the internal bus signals in the system on a chip integrated circuit 150 are driven onto the external bus 120, regardless of whether or not the address on the internal bus 110 relates to external memory 130, 132 associated with the EMI 116.

The extra SNOOP cycle in the memory access cycles can be enabled or disabled, e.g., by an appropriate bit setting in a register.

Figure 2:
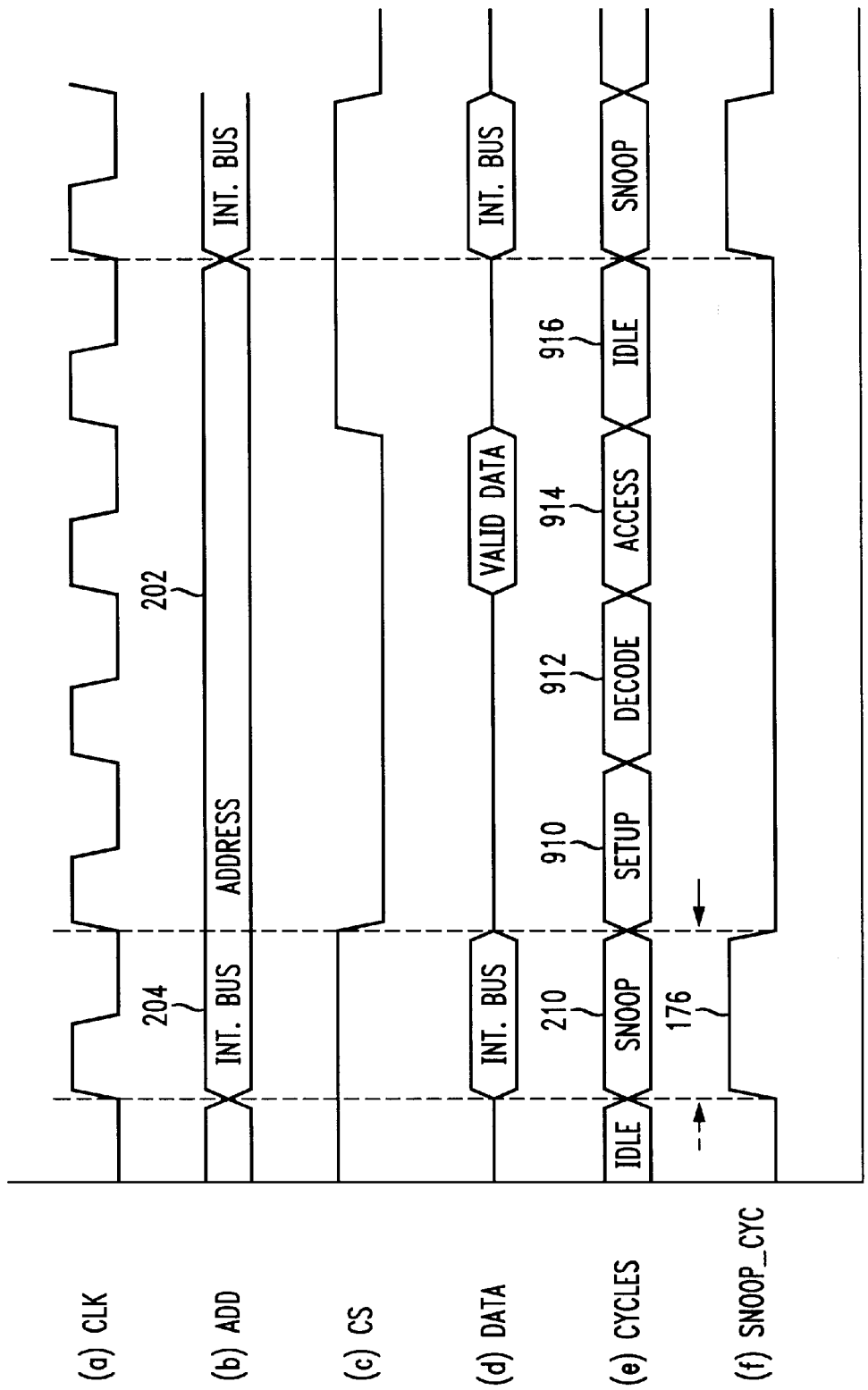
FIG. 2 shows the insertion of a snoop cycle between otherwise conventional memory access cycles in the internal bus in the system on a chip integrated circuit shown in FIG. 1.

FIG. 2 shows the insertion of a snoop cycle between otherwise conventional memory access cycles in the internal bus 110 in the system on a chip integrated circuit shown in FIG. 1.

In particular, in FIG. 2, waveform (e) shows the insertion of a snoop cycle 210 before the setup cycle 910. The snoop cycle is inserted by the processor 104 and state machine 160 shown in FIG. 1 to allow system debugging, and can be later disabled (and thus removed entirely). using an appropriate register setting (e.g., snoop control register 170) Waveform (f) shows the snoop_cyc or "snoop active' 176 signal generated by the state machine 160.

Waveforms (b) and (d) show the external address and data busses in an external bus 120. During the snoop cycle 176, the internal address and data busses from the internal bus 110 are directly passed through to the external address and data busses, respectively. During other cycles (e.g., during the setup cycle 910, decode cycle 912, access cycle 914 and idle cycle 916), the external bus 120 operates in an otherwise conventional fashion providing address and data information for external memory accesses initiated by the processor 104 or other internal device in the system on a chip integrated circuit.

The activity on the internal bus 110 may be passed through the snooping pass through device (e.g., the snooping EMI 116) either buffered or unbuffered, depending upon the particular application. For instance, in time sensitive applications, a direct electrical connection may be provided between an external bus monitor 174 and the internal bus 110. However, if timing is not as sensitive during debugging operations, a buffer 172 may be included to protect the drivers in the devices on the internal bus 110. An appropriate one- or two-way buffer may be used in the pass through of the EMI if desired, although it may not be required and/or desired due to timing constraints.

The pass through may be one-way or two-way. For instance, during the snoop cycle 176, one-way direct internal bus monitoring may allow all activity on the internal bus to be observed by appropriate circuitry in the bus monitor 174. However, in a two-way snoop technique and design, the bus monitor 174 may be given the ability to force a particular data and/or address pattern back onto the internal bus 110, keeping in mind any conflict situations which may be caused between opposing drivers.

The snoop cycle may be expanded to include and pass through individual internal signals other than basic address and data activity to the external bus 120. For instance, individual signals may be multiplexed onto the external bus 120 during the snoop cycle.

Figure 3:
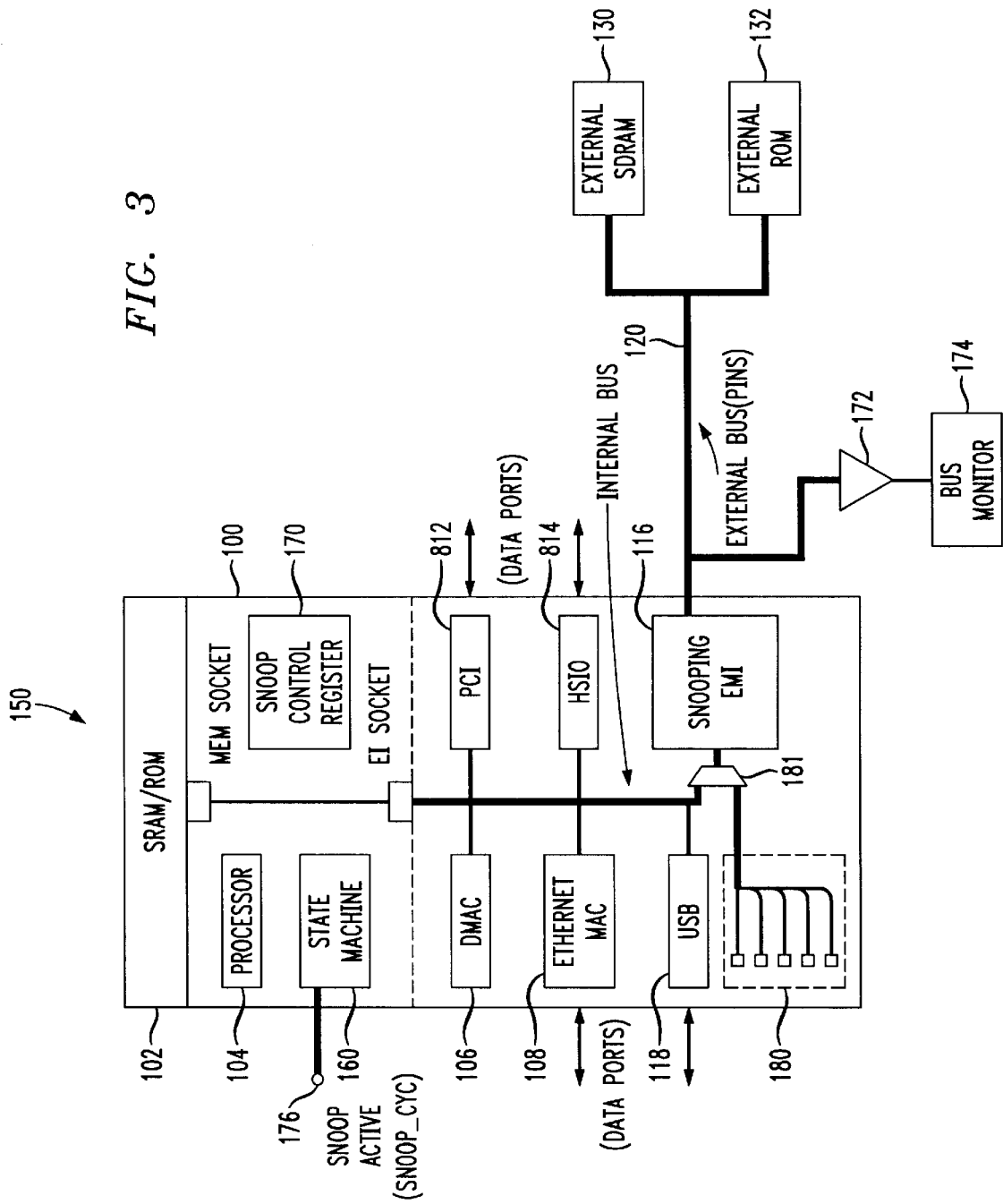
FIG. 3 shows an exemplary system on a chip integrated circuit including a snooping pass through device which passes through individual signals connected to a test pad within the system on a chip integrated circuit, in accordance with the principles of the present invention.

FIG. 3 shows an exemplary system on a chip integrated circuit including a snooping pass through device which passes through individual signals connected to a test pad within the system on a chip integrated circuit, in accordance with the principles of the present invention.

In particular, FIG. 3 shows that additional signals could be multiplexed in for pass through of additional signals to the external bus during snoop cycles 176. For instance, perhaps a system debugger desires to directly observe signals from one line of the PCI 812. To do so, the system debugger would merely bond a wire or otherwise make a connection between the desired signal line and one of the individual signal contacts 180. The select for this additional line (i.e., the multiplexer 181) would be enabled in an appropriate register accessible by the processor 104 or other device.

Thus, as shown in FIG. 3, one or more wire bond contacts 180 may be included internal to the system on a chip integrated circuit 150, and multiplexed for pass through by the snooping pass through device (e.g., the snooping EMI 116) during the snoop cycle 176 instead of the activity on the internal bus. Particular signals may be wire bonded in test ICs by the system designer to trace a particular problem, and passed through to the external bus 120 using the snooping EMI 116 during the snoop cycle 176. As shown in FIG. 3, a multiplexer 181 may be included to provide selectable pass through of either the activity on the internal bus 110, or activity on the manually selected signals connected to the wire bond contacts 180.

Figure 4:
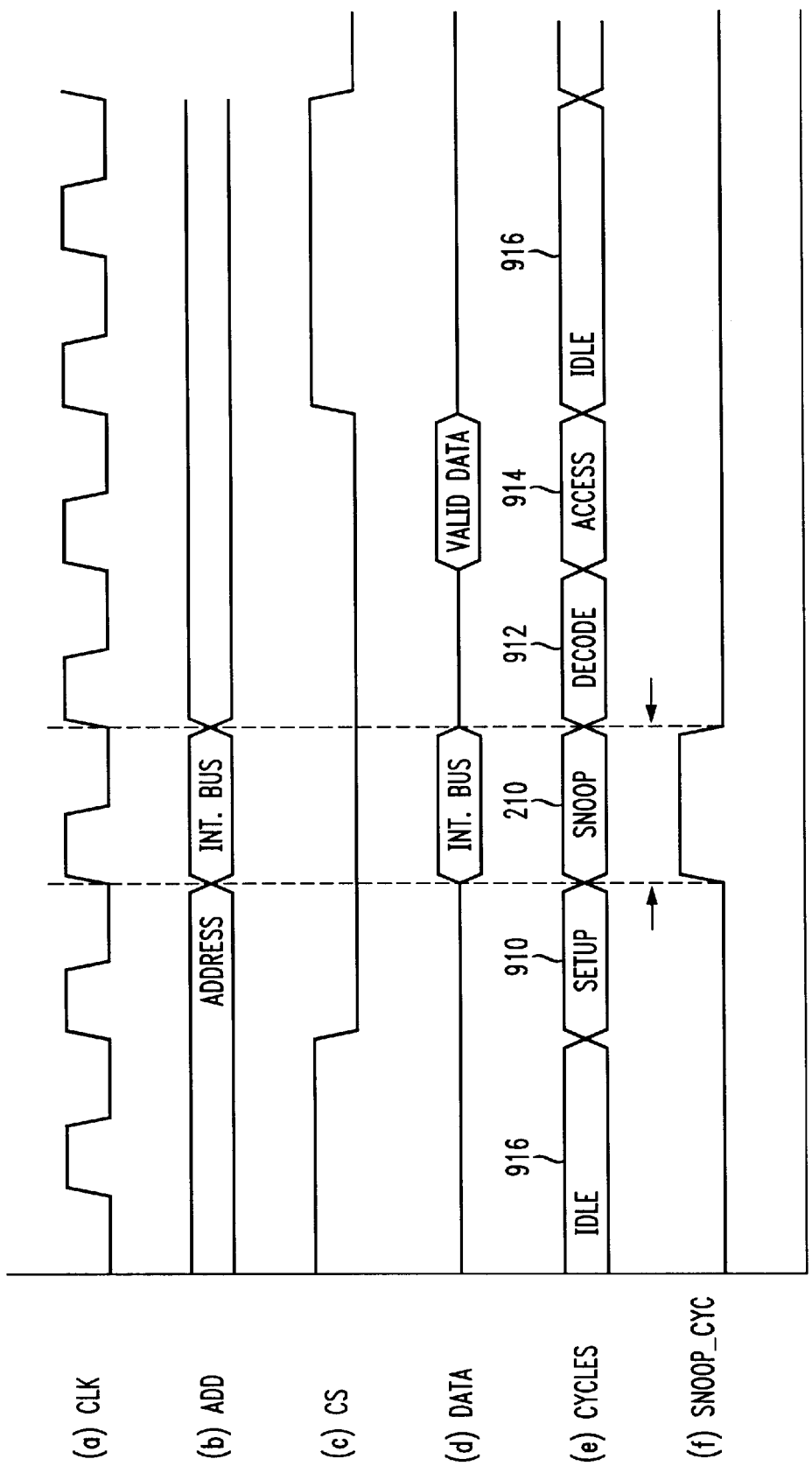
FIGS. 4 and 5 show that the snoop cycle can be inserted between any two otherwise conventional memory access cycles. For example.
Figure 5:
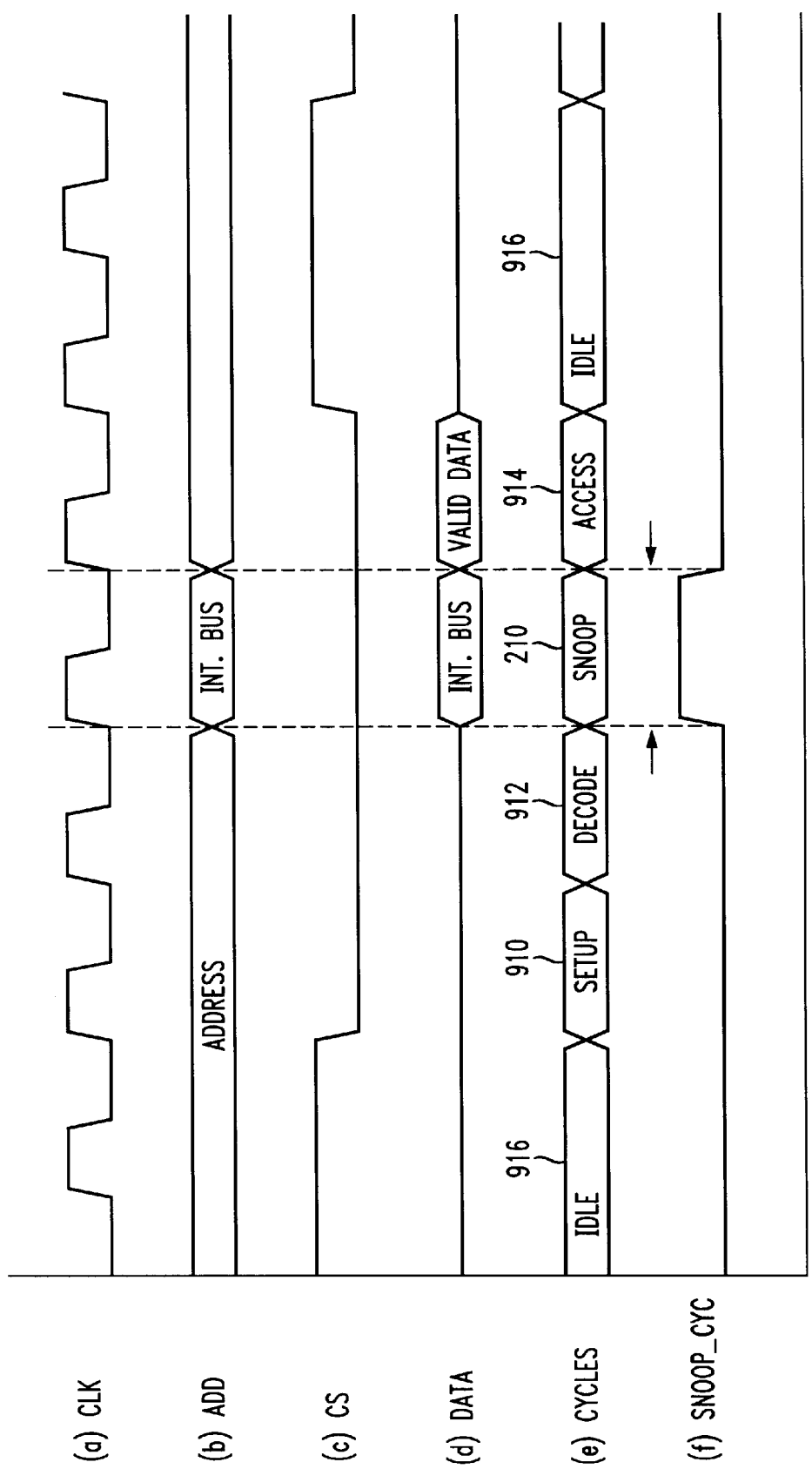

FIGS. 4 and 5 show that the snoop cycle can be inserted between any two otherwise conventional memory access cycles. The snoop cycle location may be programmably inserted between any two memory access cycles using, e.g., an appropriate setting in the snoop control register 170 or other memory location. Alternatively, the snoop cycle can be fixed within an appropriate state machine used by the processor 104 and/or other internal bus devices for memory accesses.

For instance, FIG. 4 shows the insertion of the snoop cycle between the setup cycle 910 and the decode cycle 912. FIG. 5 shows the insertion of the snoop cycle between the decode cycle 912 and the access cycle 914.

Figure 6:
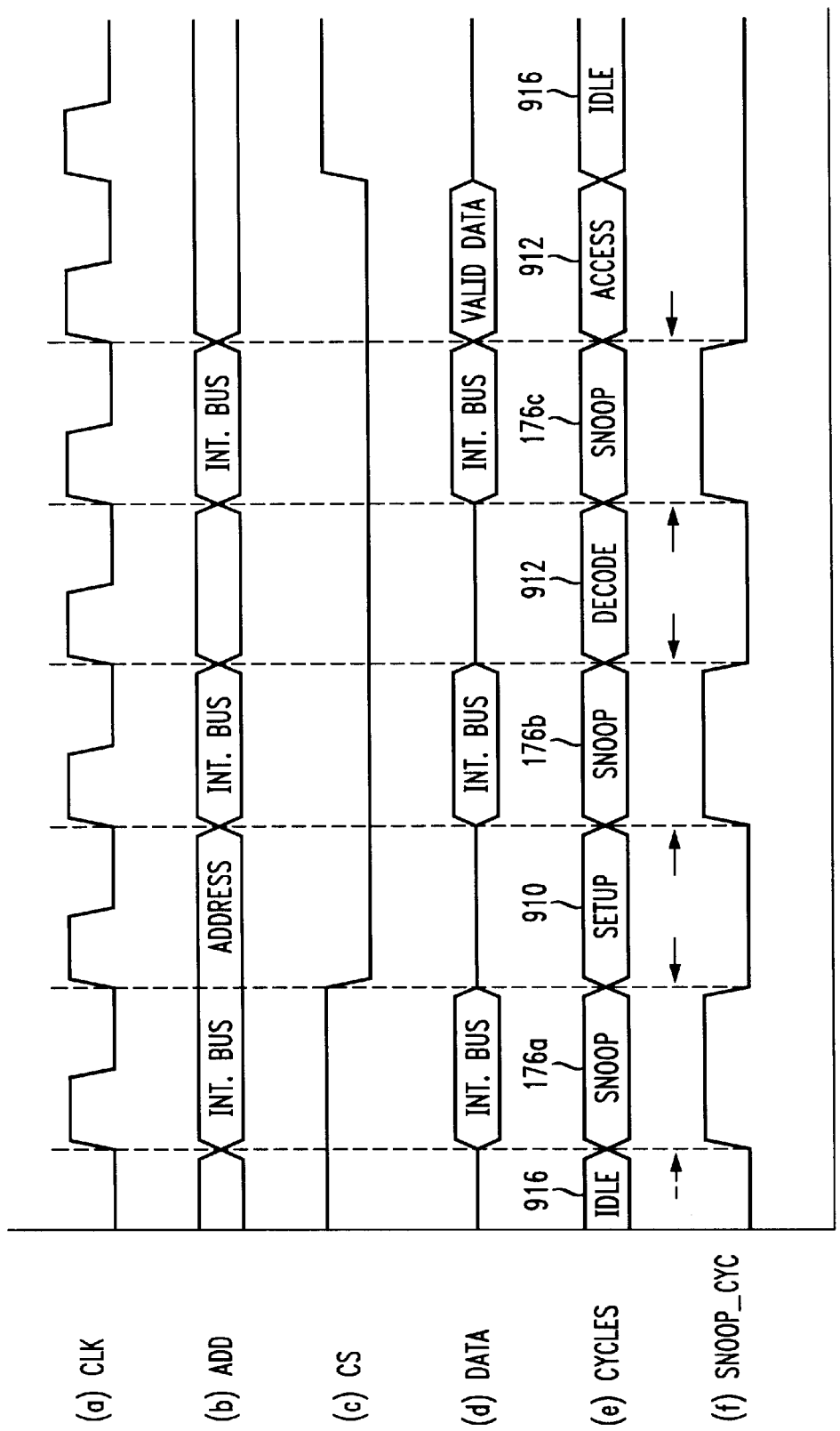
FIG. 6 shows that more than one snoop cycle may be inserted between the memory access cycles of a single memory access, in accordance with the principles of the present invention.

FIG. 6 shows that more than one snoop cycle 176 may be inserted between the memory access cycles of a single memory access, in accordance with the principles of the present invention.

In particular, in waveform (e) of FIG. 6, a single memory access includes a first snoop cycle 176a inserted (e.g., temporarily until disabled in the snoop control register 170) between the idle cycle 916 of the prior memory access and the setup cycle 910 of a current memory cycle. A second snoop cycle 176b is inserted between the setup cycle 910 and the decode cycle 912. A third snoop cycle 176c is inserted between the decode cycle 912 and the access cycle 914.

To further expand on the flexibility in debug techniques and apparatus, the snoop cycle may be inserted during idle cycles to effectively replace the idle cycle with a snoop cycle. This replacement technique has a benefit of minimizing the impact on the overall timing of the system on a chip integrated circuit.

Figure 7:
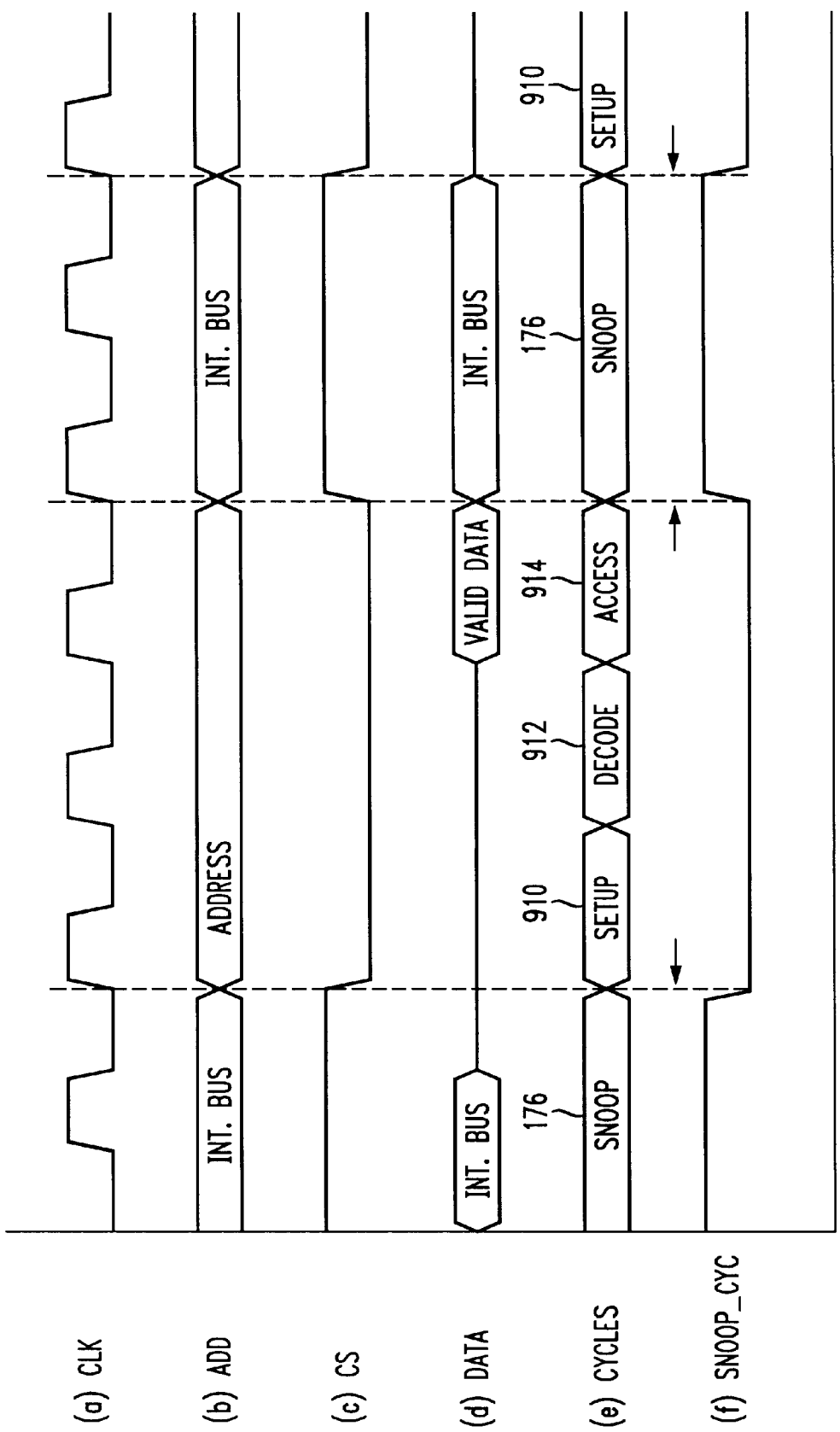
FIG. 7 shows (in particular in waveform (e)) the replacement of an idle cycle performed during normal operation of the system on a chip with a snoop cycle, in accordance with another embodiment of the present invention.

In particular, FIG. 7 shows (in particular in waveform (e)) the replacement of an idle cycle performed during normal operation of the system on a chip with a snoop cycle 176. Thus, during the periods of time which otherwise would include an idle cycle of memory accesses, activity on the internal bus 110 is passed through the snooping pass through device (e.g., the EMI 116) to an external bus.

Accordingly, isolation of subtle system problems in a completed system on a chip integrated circuit can be achieved by breaking up the otherwise conventional state machine with one or more snoop cycles to narrow down and eventually discover a system design problem.

Of course, a disadvantage in the addition of a snoop cycle is that the added cycle adds time to a memory access cycle, and otherwise slows down system. However, snoop cycles can be removed for normal operation, and used only by a system designer if and/or when a system problem requiring use of the snoop cycle arises.

To achieve actual operating speeds of a normal device with a snoop cycle inserted, faster external devices (e.g., external memory) may be used at least by the system designer in a test system to accommodate the introduction of the added snoop cycle.

Virtually any internal signal within the system on a chip may be passed through a snooping pass through device during a snoop cycle, under software or hardware control of the system designer. In a step-by-step way known to those of skill in the art, bugs can be eliminated in a systematic manner.

While the invention is shown and described with particular reference to an external memory bus (EMI) interface 816, the principles of the present invention relate equally to other components including an external bus to pins available external to the system on a chip integrated circuit.

While the invention has been described with reference to the exemplary embodiments thereof, those skilled in the art will be able to make various modifications to the described embodiments of the invention without departing from the true spirit and scope of the invention.

What is claimed is:

1. A permanently installed state generator, comprising:
   a plurality of memory access cycles within a single memory access of a system on a chip integrated circuit; and
   a system debugging snoop cycle adapted for insertion between two of said plurality of memory access cycles to allow pass through of activity on an internal bus internal to said system on a chip integrated circuit to a device external to said system on a chip integrated circuit during said snoop cycle.

2. The permanently installed state generator according to claim 1, wherein:

said snoop cycle is enabled by a software controllable register.

3. The permanently installed state generator according to claim 1, wherein:

said snoop cycle is enabled by a hardware configuration.

4. The permanently installed state generator according to claim 1, wherein said plurality of memory access cycles comprise:

a setup cycle;

a decode cycle; and an access cycle.

5. The permanently installed state generator according to claim 1, wherein said plurality of memory access cycles include:

an idle cycle.

6. The permanently installed state generator according to claim 5, wherein:

said snoop cycle replaces said idle cycle when said snoop cycle is enabled.

7. The permanently installed state generator according to claim 1, further comprising:

another snoop cycle insertable with said snoop cycle within said single memory access.

8. The permanently installed state generator according to claim 1, wherein:

a position of said snoop cycle with respect to said plurality of memory access cycles is software programmable.

9. The permanently installed state generator according to claim 1, in further combination with:

a processor.

10. The permanently installed state generator according to claim 1, further comprising:

an external memory interface in communication with said system on a chip integrated circuit.

11. The permanently installed state generator according to claim 1, further comprising:

a snoop register to enable said insertion of said snoop cycle.

12. A method of passing internal bus data through a component of a system on a chip integrated circuit, comprising:

communicating on an internal bus internal to a system on a chip integrated circuit including a permanently installed processor;

inserting a debugging snoop cycle in a memory access by said permanently installed processor; and directly passing activity on said internal bus internal to said system on a chip integrated circuit to an external bus external to said system on a chip integrated circuit during said snoop cycle.

13. The method of passing internal bus data through a component of a system on a chip integrated circuit according to claim 12, wherein:

said snoop cycle is during an otherwise idle cycle of said memory access.

14. The method of passing internal bus data through a component of a system on a chip integrated circuit according to claim 12, wherein:

said snoop cycle is inserted before a setup cycle of said memory access.

15. The method of passing internal bus data through a component of a system on a chip integrated circuit according to claim 12, wherein:

said snoop cycle is inserted before a decode cycle of said memory access.

16. The method of passing internal bus data through a component of a system on a chip integrated circuit according to claim 12, wherein:

said snoop cycle is inserted before an access cycle of said memory access.

17. The method of passing internal bus data through a component of a system on a chip integrated circuit according to claim 12, further comprising:

multiplexing a singular signal through said snooping pass through device onto said external bus during said snoop cycle.

18. Apparatus for passing internal bus data through a component of a system on a chip integrated circuit, comprising:

means for communicating on an internal bus internal to a system on a chip integrated circuit including a permanently installed processor;

means for inserting a debugging snoop cycle in a memory access by said permanently installed processor; and means for directly passing activity on said internal bus internal to said system on a chip integrated circuit to an external bus external to said system on a chip integrated circuit during said snoop cycle.

19. The apparatus for passing internal bus data through a, component of a system on a chip integrated circuit according to claim 18, wherein:

said means for inserting said snoop cycle inserts said snoop cycle during an otherwise idle cycle of said memory access.

20. The apparatus for passing internal bus data through a component of a system on a chip integrated circuit according to claim 18, wherein:

said means for inserting said snoop cycle inserts said snoop cycle before a setup cycle of said memory access.

21. The apparatus for passing internal bus data through a component of a system on a chip integrated circuit according to claim 18, wherein:

said means for inserting said snoop cycle inserts said snoop cycle before a decode cycle of said memory access.

22. The apparatus for passing internal bus data through a component of a system on a chip integrated circuit according to claim 18, wherein:

said means for inserting said snoop cycle inserts said snoop cycle before an access cycle of said memory access.

23. The apparatus for passing internal bus data through a component of a system on a chip integrated circuit according to claim 18, further comprising:

means for multiplexing a singular signal through said snooping pass through device onto said external bus during said snoop cycle.

* * * * *